US012542708B2

(12) United States Patent
Ahmed et al.

(10) Patent No.: US 12,542,708 B2
(45) Date of Patent: Feb. 3, 2026

(54) SYSTEMS AND METHODS FOR PRIORITY-AWARE NETWORK FUNCTION RESTORATION IN A WIRELESS NETWORK

(71) Applicant: Verizon Patent and Licensing Inc., Basking Ridge, NJ (US)

(72) Inventors: Riyaj Uddin Ahmed, Coppell, TX (US); Parry Cornell Booker, Sunnyvale, TX (US); Sudhakar Reddy Patil, Flower Mound, TX (US); Jerry Steben, Forth Worth, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/659,937

(22) Filed: May 9, 2024

(65) Prior Publication Data

US 2025/0350528 A1 Nov. 13, 2025

(51) Int. Cl.
*H04L 41/08* (2022.01)
*H04L 41/40* (2022.01)
*H04W 24/04* (2009.01)
*H04W 48/18* (2009.01)

(52) U.S. Cl.
CPC ............. *H04L 41/08* (2013.01); *H04W 24/04* (2013.01); *H04W 48/18* (2013.01); *H04L 41/40* (2022.05)

(58) Field of Classification Search
CPC ..... H04W 60/06; H04W 48/18; H04W 76/19; H04W 24/04; H04L 67/34
See application file for complete search history.

(56) References Cited

U.S. PATENT DOCUMENTS

| | | | |
|---|---|---|---|
| 2021/0185563 A1* | 6/2021 | Xu | H04W 80/02 |
| 2021/0410059 A1* | 12/2021 | Talebi Fard | H04W 40/02 |
| 2022/0014944 A1* | 1/2022 | Liang | H04W 76/19 |
| 2022/0141721 A1* | 5/2022 | Bartolome Rodrigo | H04W 60/06 370/331 |
| 2022/0360991 A1* | 11/2022 | Rajput | H04W 12/122 |
| 2024/0073786 A1* | 2/2024 | Lu | H04W 48/04 |

* cited by examiner

*Primary Examiner* — Mahran Y Abu Roumi

(57) ABSTRACT

A system described herein may implement a first instance of a particular Network Function ("NF") in a wireless network. The first NF instance may receive an instruction to restore functionality of a second instance of the particular NF, including a plurality of services. The first NF instance may identify state information associated with the second NF instance, which may include information identifying the plurality of services associated with the functionality provided by the second NF instance. The first NF instance may identify a priority associated with each service, and identify a sequence in which to restore each service based on such priorities. The first NF instance may restore each service, of the plurality of services indicated in the state information associated with the second NF instance, in the identified sequence. The first and second NF instances may be instances of the same type of NF.

20 Claims, 12 Drawing Sheets

SYSTEMS AND METHODS FOR PRIORITY-AWARE NETWORK FUNCTION RESTORATION IN A WIRELESS NETWORK

BACKGROUND

Wireless networks provide wireless connectivity to User Equipment ("UEs"), such as mobile telephones, tablets, Internet of Things ("IoT") devices, Machine-to-Machine ("M2M") devices, or the like. Such networks may include network functions ("NFs") that each implement respective functionality with respect to providing services such as routing services, authentication and/or authorization services, subscription management services, or the like. NFs may be implemented in a virtualized and/or distributed manner. Multiple instances of the same NF may be deployed throughout the network, which may provide for coverage among various geographical locations and may also serve as a failsafe mechanism in case one or more instances of a given NF experience a failure, outage, etc. For example, if an instance of a particular NF loses power, experiences a malfunction, becomes congested, and/or is otherwise unavailable or degraded, one or more instances of the same NF may be selected, instantiated, etc. to perform some or all of the functionality of the NF instance that has failed.

DETAILED DESCRIPTION OF EXAMPLE EMBODIMENTS

Figure 1:
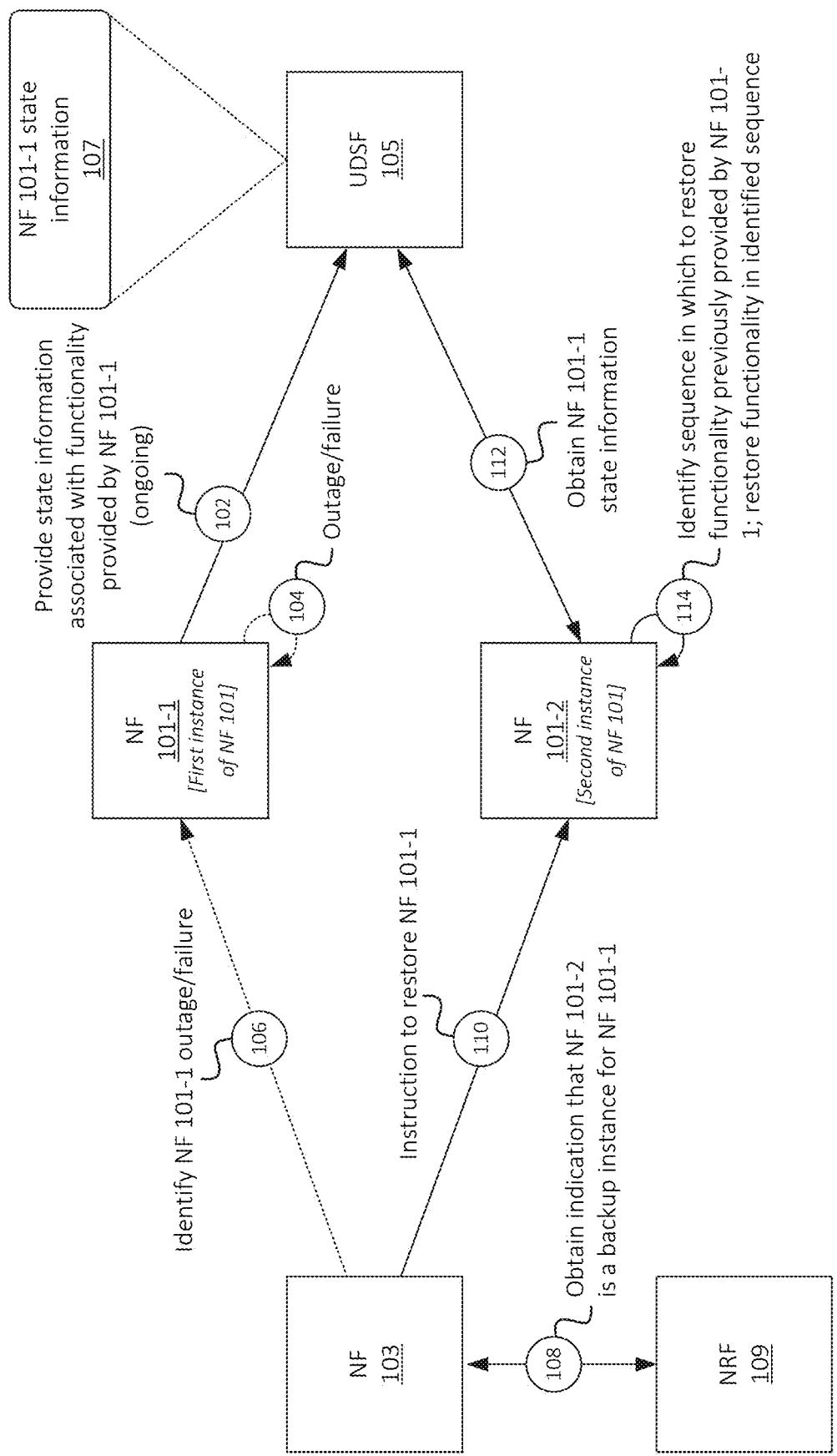
FIG. 1 illustrates an example overview of one or more embodiments described herein.

The following detailed description refers to the accompanying drawings. The same reference numbers in different drawings may identify the same or similar elements.

Wireless networks may provide connectivity to UEs, such that the UEs are able to receive services such as voice call services, content streaming services, gaming services, etc. via such wireless networks. The different services may be associated with different Quality of Service ("QoS") parameters, Service Level Agreements ("SLAs"), performance thresholds, etc. For example, a voice call service may be associated with relatively low latency thresholds, a content streaming service may be associated with relatively high throughput thresholds, etc.

NFs of a wireless network may implement functionality that facilitate the providing of services to UEs via the wireless network, such as session management functionality, routing functionality, authentication and/or authorization functionality, policy-related functionality, subscription management functionality, or the like. NFs may be implemented in a containerized and/or virtualized manner, in which multiple instances of a given NF may be implemented by the wireless network. A given NF, or a particular instance of the NF, may implement functionality with respect to different services, UEs, or communication sessions. In this manner, such NF (or NF instance) may implement functionality with respect to varying QoS parameters, SLAs, performance thresholds, etc. Situations may occur in which a particular instance of an NF fails, becomes unreachable, exhibits degraded performance, etc. For example, hardware implementing the particular instance of the NF may lose power, may undergo a hardware failure, may become overloaded, may lose network connectivity, and/or may otherwise become unreachable or non-responsive.

Embodiments described herein provide for a priority-aware restoration of a failed NF instance in a wireless network. For example, if a given NF instance fails, becomes unreachable, for example, one or more other instances of the NF may be selected, instantiated, etc. to "restore" the failed NF instance (e.g., where restoring the failed NF instance includes providing functionality previously provided by the failed NF instance). Restoring the failed NF instance may include propagating information to other elements of the network (e.g., other NFs) that previously communicated with the failed NF instance in order to manage communication sessions (e.g., establish, modify, remove, etc. communication sessions) associated with the network, obtain or modify policy-related information associated with the network, or other suitable operations. Propagating the information may include notifying such elements of the network that the failed NF instance has been replaced by a different NF instance that is now providing the functionality that was previously provided by the failed NF instance.

In accordance with some embodiments, the sequence in which the restoration occurs may be based on priority levels associated with UEs, services, communication sessions, etc. for which the functionality was previously provided by the failed NF. For example, functionality related to higher priority UEs, services, etc. may be restored before functionality related to lower priority UEs, services, etc. In this manner, the likelihood of interruption of higher priority services may be reduced or eliminated, thus preserving the user experience associated with such higher priority services.

FIG. 1 illustrates an example of the restoration of functionality provided by a failed NF instance, in accordance with some embodiments. As shown, a wireless network may include multiple types of NFs, such as NFs 101 and 103. Specifically, NF 101 may include one type of NF, while NF 103 may include a different type of NF. For example, NF 101 may include a Session Management Function ("SMF"), a Policy Control Function ("PCF"), and/or some other type of NF, while NF 103 may include an Access and Mobility Management Function ("AMF") or some other type of NF. As noted above, NF 101 and/or NF 103 may be implemented in a containerized and/or virtualized manner, and multiple instances of NF 101 and/or NF 103 may be deployed in the wireless network. The examples discussed herein refer to two instances of NF 101: NFs 101-1 and 101-2. For the sake of brevity, a first instance of the NF is referred to as "NF 101-1" and a second instance of the NF (e.g., a second instance of the same type of NF) is referred to as "NF 101-2."

In the course of operation, NF 101-1 may generate or maintain state information, context information, etc. relating to functionality implemented by NF 101-1. For example, NF 101-1 may maintain session information (e.g., protocol data unit ("PDU") session information), subscription information (e.g., indicating UE-specific parameters such as authorization information and/or QoS information), or other suitable types of state information. NF 101-1 may further provide (at 102) state information to Unstructured Data Storage Function ("UDSF") 105 and/or to some other type of information repository. NF 101-1 may provide such information on an ongoing basis, such that UDSF 105 maintains up-to-date state information 107 associated with NF 101-1 (e.g., the same state information as maintained by NF 101-1).

At some point, NF 101-1 may undergo (at 104) an outage, a failure, or some other event or condition under which NF 101-1 may become unavailable, unreachable, non-operational, or may otherwise cease implementing its configured functionality. Additionally, or alternatively, the failure of NF 101-1 may include NF 101-1 failing to perform with at least a threshold measure of performance (e.g., may exceed a maximum latency or response time threshold).

NF 103 may identify (at 106) the failure of NF 101-1. For example, NF 103 may output one or more messages, requests, etc. for which a response or acknowledgement from NF 101-1 would be expected (e.g., a request to establish or modify one or more communication sessions associated with one or more UEs, a request for policy information associated with one or more UEs, etc.). NF 103 may, for example, identify (at 106) the failure of NF 101-1 based on not receiving a response or acknowledgement within a threshold duration of time after sending a request to NF 101-1. Additionally, or alternatively, NF 103 may identify the failure of NF 101-1 based on receiving an indication from NF 101-1 or some other device or system (e.g., a router or other network device) indicating that NF 101-1 is unavailable, unreachable, etc.

Based on identifying (at 106) the failure of NF 101-1, NF 103 may output (at 108) a request, such as to Network Repository Function ("NRF") 109 or some other suitable device or system, for information identifying a backup instance of NF 101 (e.g., a backup for NF 101-1 which has failed). NRF 109 may, for example, maintain information identifying NF instances of the network, including information indicating which NF instances are associated with which geographical regions, communication sessions, network slices, or other parameters. In this example, NRF 109 may generate or maintain information indicating that NF 101-2 is a suitable backup for NF 101-1. NRF 109 may determine that NF 101-2 is a backup for NF 101-1 based on factors such as geographical location of NF 101-2 (e.g., geographical proximity of hardware implementing NF 101-2 to hardware implementing NF 101-1), load and/or capacity metrics of NF 101-2 (e.g., that NF 101-2 has capacity to accommodate additional load that would result from implementing the functionality of NF 101-1), and/or other suitable factors.

In some embodiments, NF 101-2 may have been instantiated or deployed prior to the determination (at 108) by NRF 109 that NF 101-2 should serve as a backup for NF 101-1. In some embodiments, NRF 109 may determine that NF 101-2 should be instantiated, deployed, etc. in response to the request (at 108) for a backup instance of NF 101-1.

NF 103 may output (at 110) a restoration instruction to NF 101-2. The restoration instruction may include an identifier of NF 101-1, such that NF 101-2 is "aware" of which particular NF instance should be restored. NF 101-2 may obtain (at 112) state information 107 from UDSF 105. For example, NF 101-2 may request, query, etc. UDSF 105 for state information associated with the identifier of NF 101-2, and UDSF 105 may identify that particular state information 107 is associated with NF 101-1.

In some embodiments, one or more devices in addition to or in lieu of NF 103 may identify (at 106) the failure of NF 101-1, such as one or more NFs or network devices that monitor the operational status of NF 101-1 and/or other NFs. In such embodiments, such NF or device may obtain (at 108) the indication that NF 101-2 is the backup instance for NF 101-1, and may instruct (at 110) NF 101-2 to restore the functionality of NF 101-1.

NF 101-2 may restore (at 114) functionality that was previously implemented by NF 101-1 based on the received state information 107. NF 101-2 may restore the functionality in a sequence that is based on relative priority levels associated with services, UEs, communication sessions, etc. for which the functionality was previously provided by NF 101-1. For example, NF 101-2 may restore functionality related to higher priority services, UEs, communication sessions, etc. before restoring functionality related to lower priority services, UEs, communication sessions, etc. In this manner, when NF 101-2 receives a request related to a higher priority service, there may be a lower likelihood that NF 101-2 has yet to restore functionality related to the higher priority service, which could potentially cause disruption with the service. In other words, since NF 101-2 restores higher priority services before restoring relatively lower priority services, the higher priority services may be associated with less "down time" resulting from the failure of NF 101-1.

"Restoring" the functionality of NF 101-1 may include operations such as notifying other NFs (e.g., NFs that previously communicated with NF 101-1) that NF 101-2 has replaced NF 101-1. That is, the restoration of the functionality of NF 101-1 may include notifying other NFs that the functionality previously provided by NF 101-1 is now provided by NF 101-2. The other NFs may have communicated with NF 101-1 for purposes such as handling requests to establish or modify a communication session (e.g., a PDU session) associated with one or more UEs, handling requests for policy information associated with one or more UEs, or as part of one or more other types of procedures.

The operations related to restoring functionality associated with a particular communication session, for example, may include notifying multiple different NFs or types of NFs that requests associated with the communication session should be directed to NF 101-2, as opposed to NF 101-1. In some embodiments, NF 101-2 may identify and notify such NFs that such requests should be directed to NF 101-2, rather than to NF 101-1 (e.g., that such communication session is now "handled" by NF 101-2 rather than NF 101-1, and/or that context information associated with the communication session is maintained by NF 101-2 rather than by NF 101-1). Notifying these other NFs may consume a non-zero amount of time. Further, in some implementations, NF 101-2 may be associated with a limit on the quantity of operations that may be performed or messages that may be sent in a given timeframe. Prioritizing the restoration of functionality associated with higher priority communication sessions (e.g., performing the restoration associated with such communication sessions prior to performing restoration operations associated with lower priority communication sessions) may minimize an amount of "downtime" in which other NFs of the network are "unaware" (e.g., have not been notified) that NF 101-1 has failed or is otherwise no longer available. As such, in accordance with embodiments described herein, higher priority services may have a lower likelihood of being disrupted when an NF involved in such services fails or becomes non-operational or non-responsive.

Figure 2:
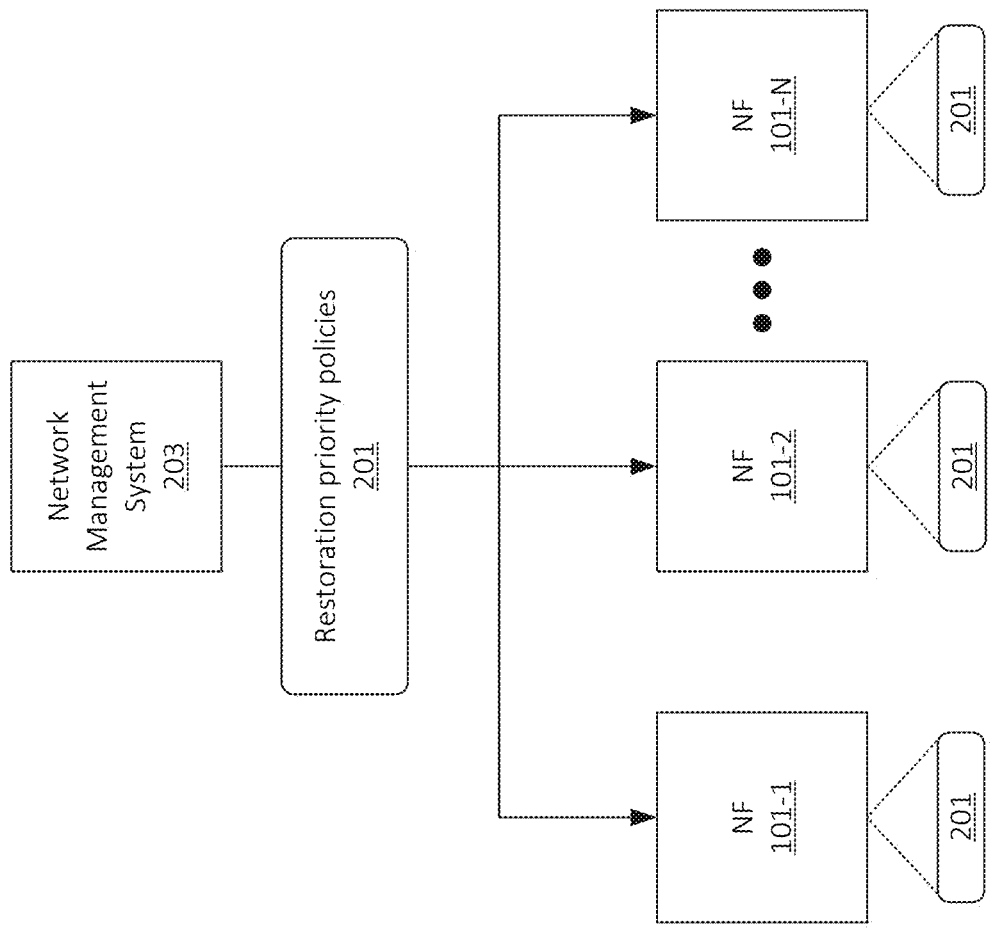
FIGS. 2 and 3 illustrate examples of maintaining or identifying restoration priority policies, in accordance with some embodiments.

In some embodiments, NF 101-2 may receive or maintain a set of restoration priority policies based on which NF 101-2 may identify the relatively priorities of services, UEs, communication sessions, etc. and accordingly restore functionality of NF 101-1 in an order that is based on such priorities. As shown in FIG. 2, in some embodiments, one or more NFs (e.g., some or all instances of NF 101, such as NF 101-1, NF 101-2, NF 101-N, etc.) may receive restoration priority policies 201 from network management system 203 or from some other suitable device or system. Network management system 203 may communicate with NFs 101 via an application programming interface ("API") or some other suitable interface. Network management system 203 may, in some embodiments, receive restoration priority policies 201 from an administrator or operator of the network. Additionally, or alternatively, network management system 203 may utilize automated techniques, such as artificial intelligence/machine learning ("AI/ML") techniques, to generate or modify restoration priority policies 201. In accordance with such embodiments, NFs 101 may each maintain restoration priority policies 201.

Figure 3:
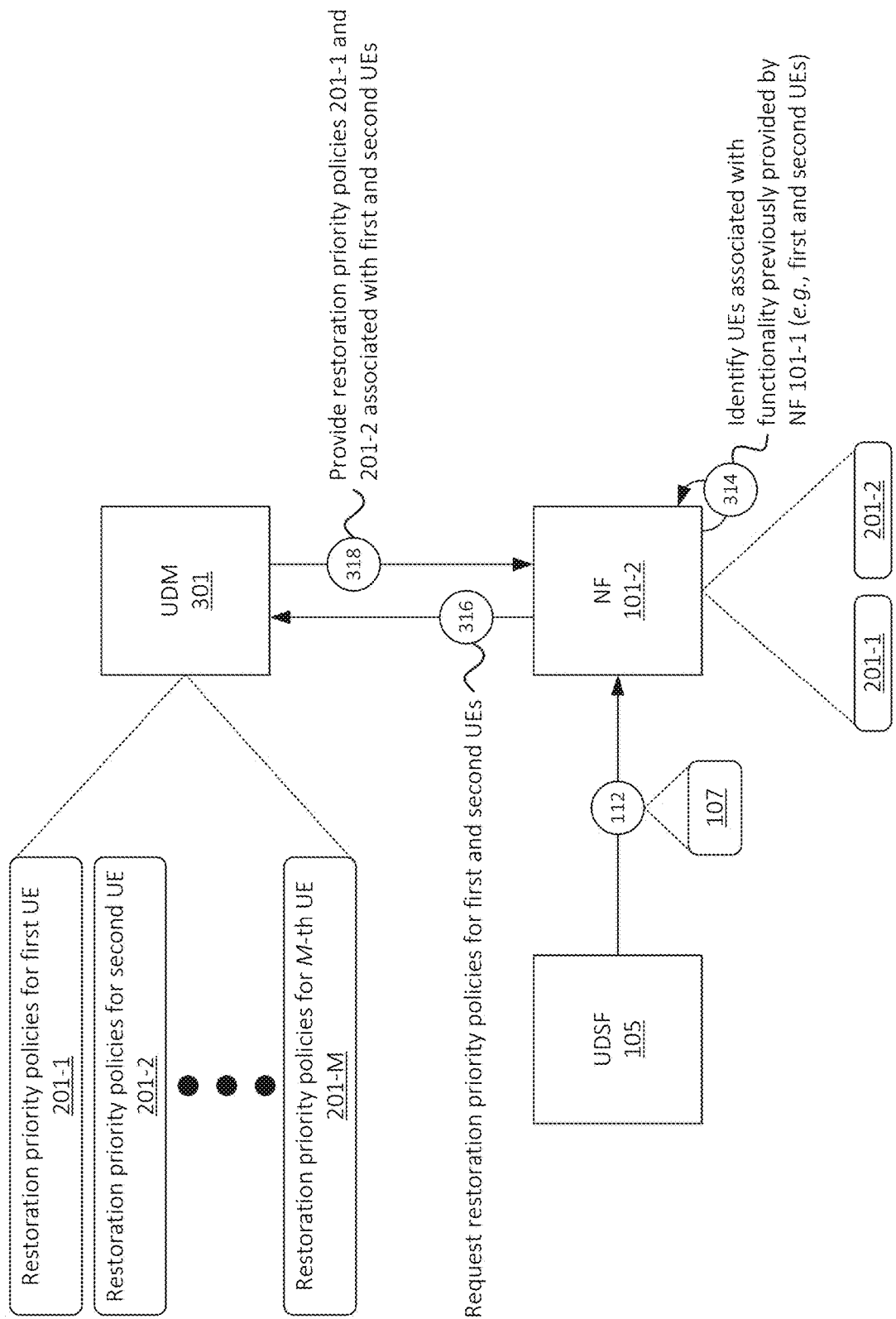

In some embodiments, as shown in FIG. 3, different UEs may be associated with different restoration priority policies. For example, a particular type of service may be associated with one priority level for one UE, and may be associated with a different priority level for another UE. For example, a first UE may be associated with a particular category such as "first responder" or "enterprise user," and a voice call service for such UE may be associated with a first priority level. A second UE may be not be associated with the particular category (e.g., may not be associated with a "first responder" or "enterprise user" category), and the same voice call service for such UE may be associated with a second priority level (e.g., which may be a lower priority than the first priority level).

In some embodiments, a user information repository, such as Unified Data Management function ("UDM") 301, a Unified Data Repository ("UDR"), a Home Subscriber Server ("HSS"), etc. may maintain respective restoration priority policies 201 for different UEs (e.g., restoration priority policies 201-1 for a first UE, restoration priority policies 201-2, for a second UE, restoration priority policies 201-M for an M-th UE, etc.). When receiving (at 112) state information 107 associated with failed NF 101-1, NF 101-2 may identify (at 314) particular UEs that are associated with such state information 107 (e.g., UEs associated with functionality that was provided by NF 101-1 prior to failure of NF 101-1). For example, state information 107 may include UE identifiers such as Subscription Permanent Identifier ("SUPI") values, Globally Unique Temporary Identifier ("GUTI") values, International Mobile Subscriber Identity ("IMSI") values, International Mobile Station Equipment Identity ("IMEI") values, Internet Protocol ("IP") addresses, and/or other information based on which particular UEs may be identified. In this example, assume that NF 101-2 identifies (at 314), based on state information 107, that NF 101-1 provided functionality associated with services for a first UE and a second UE. For example, the first and second UEs may be associated with active communication sessions (e.g., PDU sessions) for which NF 101-1 previously provided functionality, such as session management services, policy services, etc.

NF 101-2 may accordingly output (at 316) a request to UDM 301 for restoration priority policies associated with the first and second UEs. This request may include one or more identifiers of the first and second UEs, such as SUPI values, GUTI values, etc. associated with such UEs. UDM 301 may provide (at 318) particular restoration priority policies 201-1 and 201-2, which are associated with the first and second UEs, respectively. In this example, the request (at 316) may not include a request for restoration priority policies associated with the M-th UE, as such UE was not identified in state information 107 received from UDSF 105.

Figure 4:
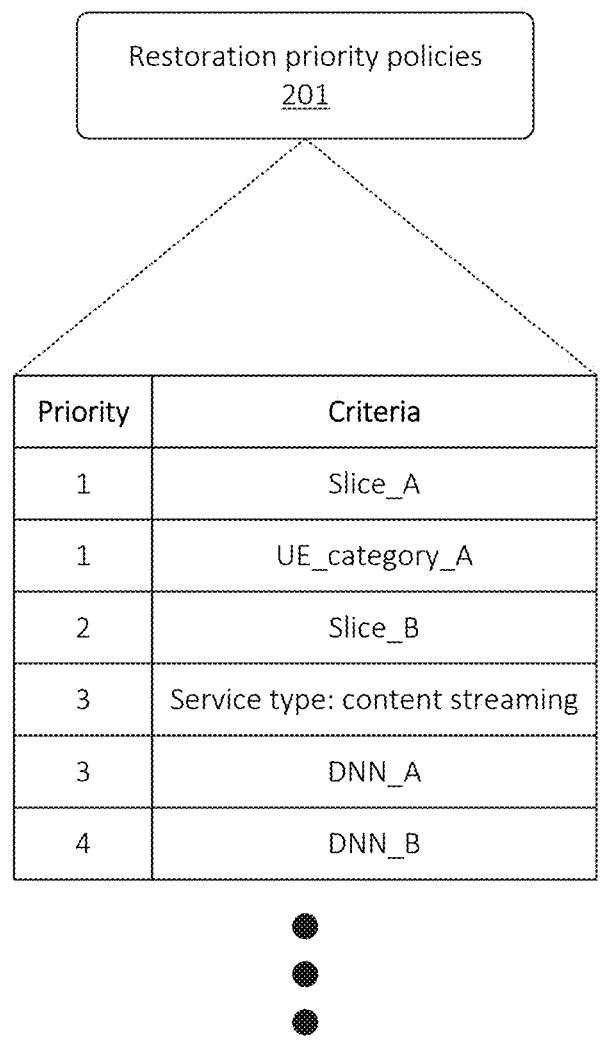
FIG. 4 illustrates an example of a set of restoration priority policies, in accordance with some embodiments.

FIG. 4 illustrates an example set of restoration priority policies 201, in accordance with some embodiments. Restoration priority policies 201, as shown in FIG. 4, may refer to "system-wide" restoration priority policies 201 (e.g., as shown in FIG. 2), or to a particular set of restoration priority policies 201 associated with a particular UE (e.g., as shown in FIG. 3). As shown, restoration priority policies 201 may indicate a relative priority level associated with respective sets of criteria. The example criteria and priority levels shown in FIG. 4 may be different from criteria and priority levels used in some embodiments. For example, in practice, additional, fewer, or different sets of criteria may be associated with different priority levels. Further, in some embodiments, priority levels associated with respective sets of criteria may be expressed in other ways, such as category names, priority scores, etc.

In this example, a first priority level (e.g., priority level 1) may be associated with multiple sets of criteria, such as a particular network slice (e.g., "Slice_A") and a particular UE category (e.g., "UE_category_A"). Assume, in one example, that state information 107 includes information indicating that a particular communication session (e.g., PDU session) is associated with the particular network slice (e.g., Slice_A). In such an example, NF 101-2 may identify that such communication session is associated with priority level 1. As another example, assume that state information 107 includes information indicating that a communication session is associated with a particular UE which, in turn is associated with UE_category_A. For example, state information 107 itself may include the information indicating that the UE is associated with the particular UE category, or NF 101-2 may obtain information (e.g., from a UDM, UDR, etc.) indicating that the particular UE is associated with the particular UE category. In this example as well, NF 101-2 may identify that this communication session is associated with priority level 1.

The sets of criteria may be specified in terms of any suitable parameters, traffic descriptors, fields, flags, identifiers, etc. that may be included in state information 107. For example, state information 107 may include, for a given communication session, a UE identifier (e.g., IMSI, IMEI, etc.), a slice identifier (e.g., Network Slice Selection Assistance Information ("NSSAI") value), a Data Network Name ("DNN"), a traffic or service type (e.g., a flag, value, identifier, label, category, etc. such as "content streaming," "voice call," etc.), or other suitable parameter, identifier, etc. that may be identified with respect to communication sessions associated with the network.

Figure 5:
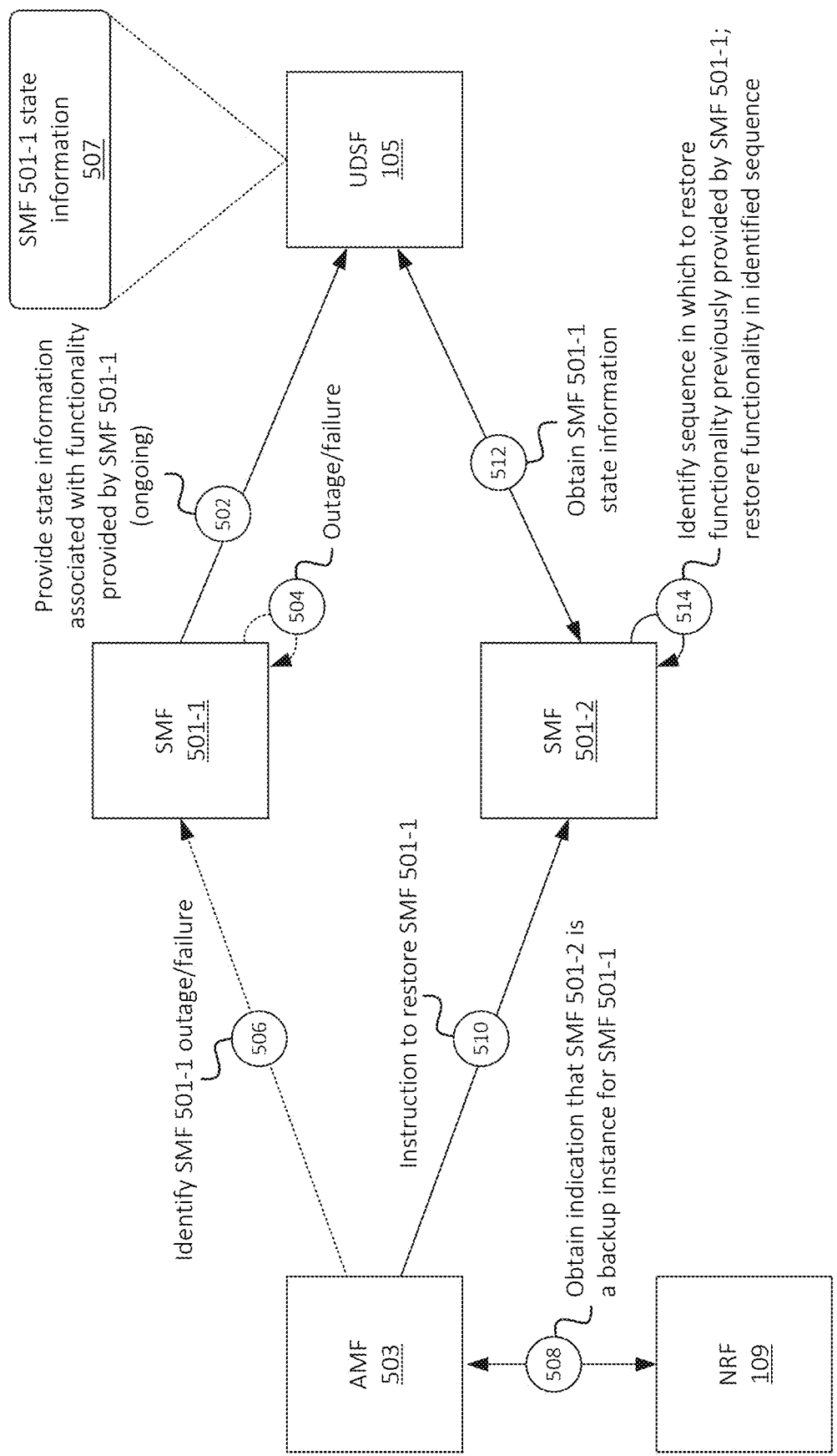
FIGS. 5 and 6 illustrate an example of scenario of a particular NF instance restoring functionality of a failed NF instance based on restoration priority policies, in accordance with some embodiments.

FIG. 5 illustrates an example restoration of a particular NF in accordance with some embodiments, such as a particular SMF 501-1, that has failed or otherwise is unable to perform its expected functionality. As shown, during the course of operation of SMF 501-1, SMF 501-1 may provide (at 502) state information to UDSF in an ongoing manner. The state information may include, for example, information regarding PDU sessions that have been established or modified based on operations performed by SMF 501-1. Such information may include, for example, PDU session identifiers, identifiers of UEs with which the PDU sessions are associated, identifiers of other NFs with which the PDU sessions are associated (e.g., User Plane Functions ("UPFs"), Binding Support Functions ("BSFs"), AMFs, PCFs, etc.), network slices with which the PDU sessions are associated (e.g., NSSAI values or other suitable identifiers), DNNs with which the PDU sessions are associated, traffic or service types with which the PDU sessions are associated, etc. As such, UDSF 105 may maintain state information 507 associated with SMF 501-1.

At some point, SMF 501-1 may experience (at 504) an outage, a failure, or some other event that causes SMF 501-1 to fail, become non-operational, degraded, etc. After the failure has occurred (at 504) with respect to SMF 501-1, another NF, such as AMF 503, may identify (at 506) the failure of SMF 501-1. For example, AMF 503 may attempt (at 506) to communicate with the establishment of a PDU session, a modification or removal of an existing PDU session, and/or may otherwise attempt to communicate with SMF 501-1. Due to the failure of SMF 501-1, AMF 503 may not receive a response to such requests, and/or may receive a response from a routing mesh or other device or system indicating that SMF 501-1 has failed or is unreachable.

Based on determining that SMF 501-1 has failed or otherwise has become unreachable, AMF 503 may obtain (at 508) an indication from NRF 109 that SMF 501-2 is a backup instance for SMF 501-1 (e.g., SMF 501-2 is or will be performing the functionality previously performed by SMF 501-1). AMF 503 may accordingly output (at 510) an instruction to SMF 501-2 to restore the functionality previously performed by SMF 501-1. In some embodiments, AMF 503 may provide an identifier, associated with SMF 501-1, to SMF 501-2. SMF 501-2 may obtain (at 512) state information 507 as previously provided to UDSF 105 by SMF 501-1.

SMF 501-2 may further identify (at 514) a sequence in which to restore the functionality previously provided by SMF 501-1. For example, as discussed above, SMF 501-2 may maintain a set of restoration priority policies 201 (e.g., as provided by Network management system 203 or some other suitable device or system). Additionally, or alternatively, SMF 501-2 may identify UEs associated with state information 507 (e.g., UEs for which SMF 501-1 previously provided functionality such as session management functionality), and may obtain per-UE restoration priority policies (e.g., from UDM 301 or some other UE information repository). SMF 501-2 may accordingly restore functionality associated with failed SMF 501-1 in an order, sequence, etc. determined based on the relative priority levels of the communication sessions that were previously managed by SMF 501-1.

Figure 6:
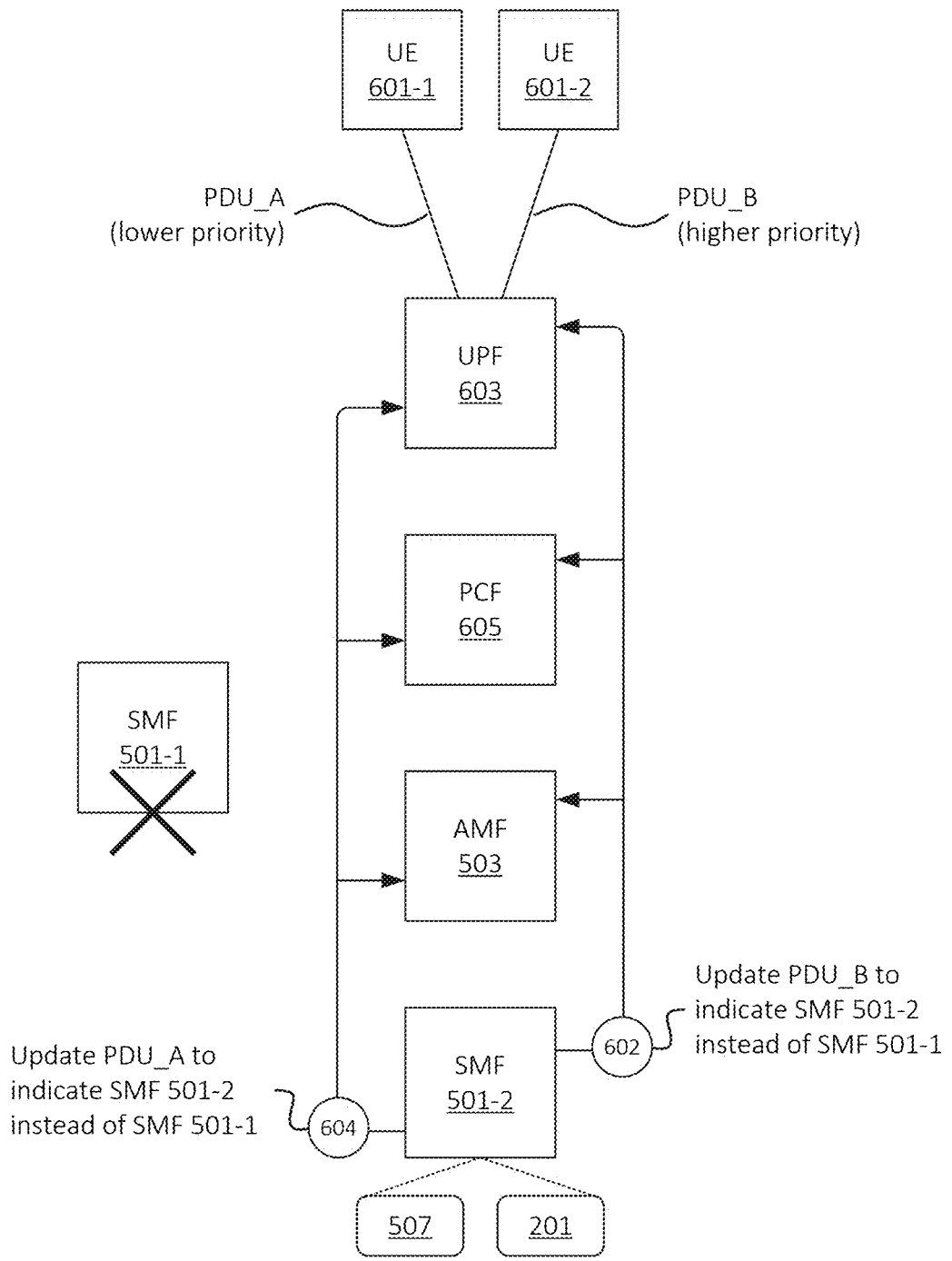

FIG. 6 illustrates an example of restoring the functionality of SMF 501-1 in an order that is based on relative priority levels of the communication sessions previously managed by SMF 501-1 (e.g., as indicated in state information 507). In this example, assume that SMF 501-1 previously managed (e.g., maintained and/or provided state information 507 for) communication sessions example UEs 601-1 and 601-2. For example, SMF 501-1 may have previously managed a first PDU session (referred to as "PDU_A") between UE 601-1 and UPF 603, and a second PDU session (referred to as "PDU_B") between UE 601-2 and UPF 603. While this example is presented in the context of two PDU sessions between two different UEs 601 and one UPF 603, similar concepts may apply in different circumstances. For example, similar concepts as described herein may apply to multiple PDU sessions between UE 601 and one UPF 603, multiple PDU sessions between multiple UEs 601 and different respective UPFs 603, and so on.

Continuing with the example, state information 507 may provide identifiers of particular NFs or NF instances that are associated with PDU_A and PDU_B. Such identifiers may include an NF identifier, an instance identifier, etc. The identifiers included in state information 507 may include identifiers of UPF 603 (e.g., which may be an endpoint of PDU_A and/or PDU_B), PCF 605 (e.g., which may maintain policy information associated with PDU_A and PDU_B), AMF 503 (e.g., which may manage access and/or mobility for UE 601-1 and/or UE 601-2), a BSF, and/or other NFs that are associated with PDU_A, PDU_B, UE 601-1, and/or UE 601-2. As noted above, state information 507 may include information regarding additional PDU sessions, other quantities or types of NFs that are associated with such PDU sessions, etc.

Further, assume that SMF 501-2 has been selected, instantiated, etc. to replace SMF 501-1 (e.g., to perform functionality previously performed by SMF 501-1). As discussed above, NRF 109 may maintain or provide an indication that SMF 501-2 has been selected to replace SMF 501-1. SMF 501-2 may determine (e.g., based on state information 507 and restoration priority policies 201) that PDU_B is associated with a higher priority than PDU_A. In some embodiments, the determination that PDU_B is associated with a higher priority may be based on a comparison of attributes of PDU_B (e.g., a service type, a device type or category of UE 601-1, a DNN, a network slice, etc.) to restoration priority policies 201 in order to identify a measure of priority associated with PDU_B. Similarly, the determination that PDU_A is associated with a lower priority may be based on a comparison of attributes of PDU_A to restoration priority policies 201 in order to identify a measure of priority associated with PDU_A (e.g., a relatively lower priority than the priority of PDU_B). In some embodiments, the determination that PDU_B is a higher priority than PDU_A may be based on one or more factors in addition to priority levels indicated in restoration priority policies 201.

As such, SMF 501-2 may perform restoration operations for PDU_B prior to performing restoration operations for PDU_A. For example, SMF 501-2 may output (at 602) a notification to UPF 603, AMF 503, PCF 605 (e.g., an Npcf_SMPolicyControl_UpdateNotify_Request), and/or one or more other NFs with which PDU_B is associated that SMF 501-2 is handling PDU_B (e.g., is replacing SMF 501-1 with respect to PDU_B). As noted above, SMF 501-2 may identify UPF 603, PCF 605, etc. based on information included in state information 507. Additionally, or alternatively, SMF 501-2 may identify UPF 603, PCF 605, etc. by querying NRF 109 for information identifying which NFs or NF instances are associated with PDU_B and/or UE 601-2.

Providing such notifications may facilitate the routing of messages such as notifications, requests, etc. from UPF 603, PCF 605, etc., where such messages are related to functionality that was previously provided by SMF 501-1. As noted above, the functionality that was previously provided by SMF 501-1 may include functionality related to management (e.g., establishment, modification, removal, etc.) of PDU sessions such as PDU_A and PDU_B. As such, when outputting a session management request, UPF 603, PCF 605, etc. may be "aware" that such request should be sent to SMF 501-2, rather than to SMF 501-1. For example, when outputting a policy request for a given PDU session, PCF 605 may send such request to SMF 501-2, instead of to SMF 501-1. As another example, when outputting a session management request (e.g., a PDU session establishment request, a PDU session modification request, a PDU session termination request, etc.) associated with PDU_A, PDU_B, and/or UE 601-2, AMF 503 may make such request to SMF 501-2 instead of to SMF 501-1.

After SMF 501-2 has performed restoration procedures with respect to PDU_B (e.g., has notified UPF 603, PCF 605, AMF 503, a BSF, and/or one or more other NFs that SMF 501-2 is replacing SMF 501-1), SMF 501-2 may proceed with subsequently performing restoration procedures with respect to PDU_A. For example, SMF 501-2 may notify one or more NFs with which PDU_A and/or UE 601-1 are associated (e.g., UPF 603, PCF 605, AMF 503, a BSF, etc.) that UE 601-2 has replaced UE 601-1. As noted above, performing (at 602) the restoration operations with respect to PDU_B before performing (at 604) restoration operations with respect to PDU_A may minimize downtime of PDU_B, during which requests (e.g., policy requests, session management requests, etc.) may be routed or provided to failed SMF 501-1. Minimizing such downtime may enhance the user experience, performance, and reliability of higher priority sessions.

Figure 7:
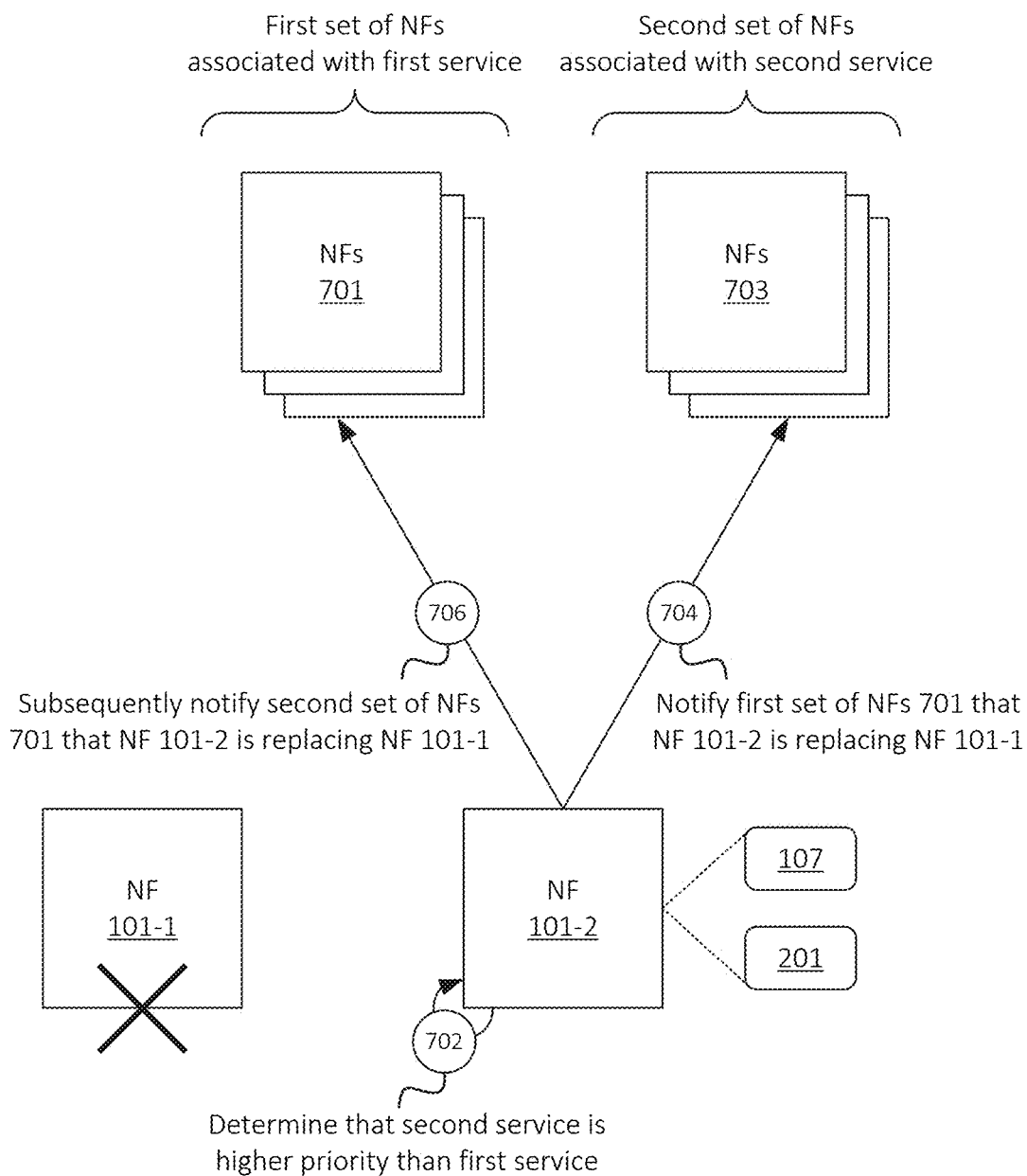
FIG. 7 illustrates an example scenario of a particular NF instance restoring functionality of a failed NF instance based on restoration priority policies, in accordance with some embodiments.

As noted above, different communication sessions, services, etc. may be associated with different NFs or sets of NFs. For example, as shown in FIG. 7, assume that a first instance of NF 101 (e.g., NF 101-1) is handling or is otherwise associated with a first service and a second service. For example, as noted above, NF 101-1 may implement or include a particular SMF that manages one or more communication sessions, a particular AMF that manages access and/or mobility functionality for one or more UEs, a particular PCF that performs policy-related functionality with respect to one or more communication sessions and/or UEs, etc. Assume that NF 101-1 has failed, and that NF 101-2 has been selected, instantiated, etc. to replace NF 101-1. Further assume that state information 107 (e.g., as previously provided by NF 101-1) indicates that NF 101-1 was previously handling, associated with, etc. a first service and a second service. Further assume that the first service is associated with a first set of NFs 701, and that the second service is associated with a second set of NFs 703. In this example, the first and second services may be associated with the same UE (e.g., a UE that currently receives both services) or multiple UEs. As one example, the first service may be a content streaming service and the first set of NFs 701 may be associated with a first network slice, and the second service may be a voice call service and the second set of NFs 703 may be associated with a second network slice. As another example, the first service may be associated with a first DNN such as an "Internet" DNN, and the second service may be associated with a second DNN such as an Internet Protocol ("IP") Multimedia Subsystem ("IMS") DNN.

Based on the state information and restoration priority policies 201, NF 101-2 may determine (at 702) that the second service is associated with a higher priority than the first service. As such, NF 101-2 may perform restoration operations with respect to the first service prior to performing restoration operations with respect to the second service. For example, NF 101-2 may notify (at 704) the second set of NFs 703 that NF 101-2 has replaced NF 101-1, and may subsequently notify (at 706) the first set of NFs 701 that NF 101-2 has replaced NF 101-1.

In some embodiments, the restoration operations described above may include performing a temporary restoration. For example, when notifying NFs 701 and 703 that NF 101-2 has replaced NF 101-1, NFs 701 and 703 may revert to communicating with (or attempting to communicate with) NF 101-1 after a particular duration of time. For example, after receiving a notification that NF 101-2 has replaced NF 101-1, NFs 701 and 703 may initiate a timer (e.g., 30 seconds, two minutes, one hour, etc.), after which NFs 701 and 703 may revert to communicating with (or attempting to communicate with) NF 101-1. In some embodiments, when notifying NFs 701 and 703 that NF 101-2 has replaced NF 101-1, NF 101-2 may indicate a duration of time for which NFs 701 and 703 should communicate with NF 101-2 instead of NF 101-1. On the other hand, in some embodiments, NFs 701 and 703 may maintain information indefinitely (e.g., in the absence of receiving a notification or instruction to the contrary) indicating that NF 101-2 has replaced NF 101-1.

While FIG. 7 provides an example in the context of an instance of one particular type of NF failing, and restoration operations being performed by another instance of this type of NF, similar concepts may apply to any suitable type of NF that has failed in a wireless network (e.g., a core of a wireless network) and for which another instance of such NF performs restoration operations. In such scenarios, the NF performing the restoration operations may identify restoration policies that are applicable to communication sessions, policy information, or other suitable type of information managed, handled, maintained, etc. by the NF instance that has failed, and performing restoration operations in an order based on a priority of such communication sessions policy information, etc. that is determined based on the restoration policies. As discussed above, performing the restoration operations may include notifying other NFs of the network that such particular NF instance has replaced the failed NF instance, and that the other NFs should communicate with the particular NF instance in lieu of the NF instance that has failed.

Figure 8:
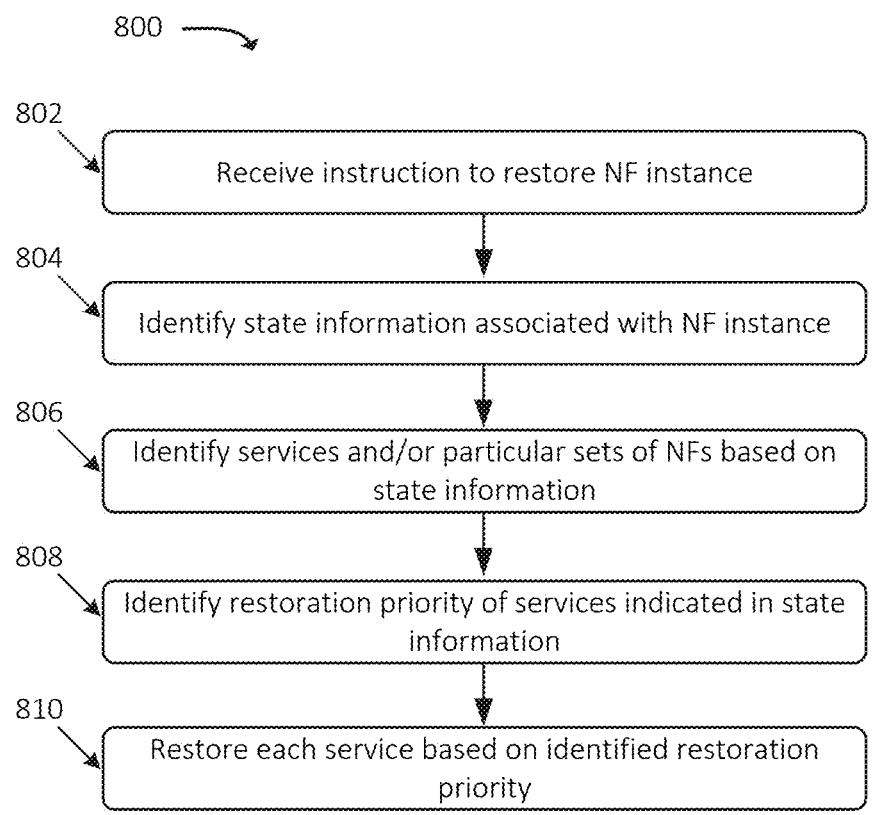
FIG. 8 illustrates an example process for a particular NF instance restoring functionality of a failed NF instance based on restoration priority policies, in accordance with some embodiments.

FIG. 8 illustrates an example process 800 for a particular NF instance restoring functionality of a failed NF instance based on restoration priority policies. In some embodiments, some or all of process 800 may be performed by an instance of a particular NF of a wireless network (e.g., NF 101-2). As noted above, NF 101-2 may be an instance of a same type of NF as another instance (e.g., NF 101-1) of such NF type. For example, NFs 101-1 and 101-2 may be, or may implement, an SMF, an AMF, a PCF, and/or some other suitable NF of the wireless network.

As shown, process 800 may include receiving (at 802) an instruction to restore a particular NF instance. For example, NF 101-2 may receive an instruction, such as from a different NF of the wireless network, to restore functionality of NF 101-1. For example, the NF providing such instruction may have determined that NF 101-1 is unreachable, is non-operational, has failed, or is otherwise unable to implement its respective functionality. In some embodiments, the instruction may include an identifier of NF 101-1.

Process 800 may further include identifying (at 804) state information associated with the particular NF instance. For example, NF 101-2 may request state information 107, associated with NF 101-1, from UDSF 105 or from some other suitable device or system that is able to provide such information. As discussed above, NF 101-1 may have provided such state information 107 to UDSF 105 while implementing its respective functionality. In this sense, UDSF 105 may maintain up-to-date, current state information 107 associated with services provided by NF 101-1.

Process 800 may additionally include identifying (at 806) services and/or particular sets of NFs based on the state information. For example, as discussed above, state information 107 may include NF identifiers, UE identifiers, PDU session identifiers, DNNs, network slice identifiers, traffic and/or service types, and/or other suitable information identifying attributes of services associated with the functionality provided by NF 101-1 (e.g., previously provided by NF 101-1 prior to becoming unreachable, non-operational, etc.).

Process 800 may also include identifying (at 808) a restoration priority of some or all of the services indicated in state information 107. For example, NF 101-2 may maintain or receive restoration priority policies 201, based on which NF 101-2 may identify a relative priority of each service associated with functionality provided by NF 101-1. NF 101-2 may, for instance, compare attributes of the services to criteria include in restoration priority policies 201 in order to suitably identify the relative priority of each such service.

Process 800 may further include restoring (at 810) each service in a sequence that is based on the identified restoration priority for each service. For example, NF 101-2 may restore higher priority services prior to restoring lower priority services, and/or may otherwise prioritize the restoration of higher priority services over or ahead of the restoration of lower priority services. As discussed above, restoring a particular service may include notifying a particular set of NFs, associated with the service, that NF 101-2 has replaced NF 101-1. As such, the particular set of NFs may communicate with NF 101-2 in the future, in lieu of attempting to communicate with NF 101-1. For example, in situations where NF 101-1 has failed or is otherwise unable to implement its functionality, communicating with NF 101-2 instead of NF 101-1 may ensure that the services previously handled by NF 101-1 experience minimal or no disruption. Further, since higher priority services are restored before lower priority services, the possibility of disruption to higher priority services is further minimized, in accordance with embodiments described herein.

Figure 9:
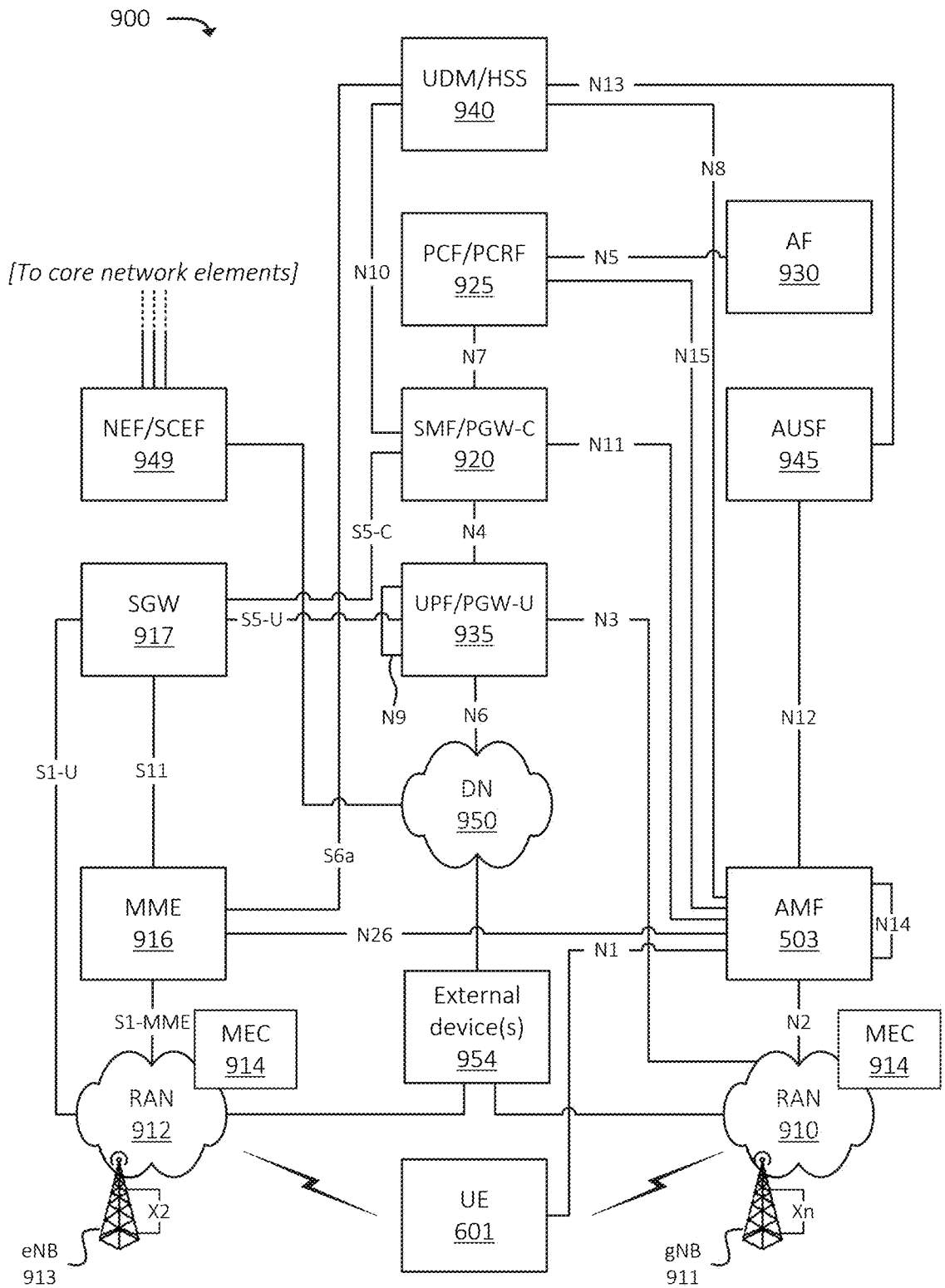
FIGS. 9 and 10 illustrate example environments in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 900 may represent or may include a 5G core ("5GC"). As shown, environment 900 may include UE 601, RAN 910 (which may include one or more Next Generation Node Bs ("gNBs") 911), RAN 912 (which may include one or more evolved Node Bs ("eNBs") 913), and various network functions such as AMF 503, Mobility Management Entity ("MME") 916, Serving Gateway ("SGW") 917, SMF/Packet Data Network ("PDN") Gateway ("PGW")-Control plane function ("PGW-C") 920, PCF/Policy Charging and Rules Function ("PCRF") 925, Application Function ("AF") 930, UPF/PGW-User plane function ("PGW-U") 935, Unified Data Management ("UDM")/Home Subscriber Server ("HSS") 940, Authentication Server Function ("AUSF") 945, and Network Exposure Function ("NEF")/Service Capability Exposure Function ("SCEF") 949. Environment 900 may also include one or more networks, such as Data Network ("DN") 950. Environment 900 may include one or more additional devices or systems communicatively coupled to one or more networks (e.g., DN 950), such as UDSF 105, one or more external devices 954, and/or some other device or system.

The example shown in FIG. 9 illustrates one instance of each network component or function (e.g., one instance of SMF/PGW-C 920, PCF/PCRF 925, UPF/PGW-U 935, UDM/HSS 940, and/or AUSF 945). In practice, environment 900 may include multiple instances of such components or functions. For example, in some embodiments, environment 900 may include multiple "slices" of a core network, where each slice includes a discrete and/or logical set of network functions (e.g., one slice may include a first instance of AMF 503, SMF/PGW-C 920, PCF/PCRF 925, and/or UPF/PGW-U 935, while another slice may include a second instance of AMF 503, SMF/PGW-C 920, PCF/PCRF 925, and/or UPF/PGW-U 935). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. In some implementations, one or more devices of environment 900 may be physically integrated in, and/or may be physically attached to, one or more other devices of environment 900. Alternatively, or additionally, one or more of the devices of environment 900 may perform one or more network functions described as being performed by another one or more of the devices of environment 900.

Additionally, one or more elements of environment 900 may be implemented in a virtualized and/or containerized manner. For example, one or more of the elements of environment 900 may be implemented by one or more Virtualized Network Functions ("VNFs"), Cloud-Native Network Functions ("CNFs"), etc. In such embodiments, environment 900 may include, may implement, and/or may be communicatively coupled to an orchestration platform that provisions hardware resources, installs containers or applications, performs load balancing, and/or otherwise manages the deployment of such elements of environment 900. In some embodiments, such orchestration and/or management of such elements of environment 900 may be performed by, or in conjunction with, the open-source Kubernetes® application programming interface ("API") or some other suitable virtualization, containerization, and/or orchestration system.

Elements of environment 900 may interconnect with each other and/or other devices via wired connections, wireless connections, or a combination of wired and wireless connections. Examples of interfaces or communication pathways between the elements of environment 900, as shown in FIG. 9, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 9, such as Service-Based Interfaces ("SBIs"), including an Namf interface, an Nudm interface, an Npcf interface, an Nupf interface, an Nnef interface, an Nsmf interface, and/or one or more other SBIs.

UE 601 may include a computation and communication device, such as a wireless mobile communication device that is capable of communicating with RAN 910, RAN 912, and/or DN 950. UE 601 may be, or may include, a radio-telephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a programmable logic controller or other industrial controller, a Machine-to-Machine ("M2M") device, or the like), a Fixed Wireless Access ("FWA") device, or another type of mobile computation and communication device. UE 601 may send traffic to and/or receive traffic (e.g., user plane traffic) from DN 950 via RAN 910, RAN 912, and/or UPF/PGW-U 935.

RAN 910 may be, or may include, a 5G RAN that implements a 5G RAT and that includes one or more base stations (e.g., one or more gNBs 911), via which UE 601 may communicate with one or more other elements of environment 900. UE 601 may communicate with RAN 910 via an air interface (e.g., as provided by gNB 911). For instance, RAN 910 may receive traffic (e.g., user plane traffic such as voice call traffic, data traffic, messaging traffic, etc.) from UE 601 via the air interface, and may communicate the traffic to UPF/PGW-U 935 and/or one or more other devices or networks. Further, RAN 910 may receive signaling traffic, control plane traffic, etc. from UE 601 via the air interface, and may communicate such signaling traffic, control plane traffic, etc. to AMF 503 and/or one or more other devices or networks. Additionally, RAN 910 may receive traffic intended for UE 601 (e.g., from UPF/PGW-U 935, AMF 503, and/or one or more other devices or networks) and may communicate the traffic to UE 601 via the air interface.

RAN 912 may be, or may include, an LTE RAN that implements an LTE RAT and that includes one or more base stations (e.g., one or more eNBs 913), via which UE 601 may communicate with one or more other elements of environment 900. UE 601 may communicate with RAN 912 via an air interface (e.g., as provided by eNB 913). For instance, RAN 912 may receive traffic (e.g., user plane traffic such as voice call traffic, data traffic, messaging traffic, signaling traffic, etc.) from UE 601 via the air interface, and may communicate the traffic to UPF/PGW-U 935 (e.g., via SGW 917) and/or one or more other devices or networks. Further, RAN 912 may receive signaling traffic, control plane traffic, etc. from UE 601 via the air interface, and may communicate such signaling traffic, control plane traffic, etc. to MME 916 and/or one or more other devices or networks. Additionally, RAN 912 may receive traffic intended for UE 601 (e.g., from UPF/PGW-U 935, MME 916, SGW 917, and/or one or more other devices or networks) and may communicate the traffic to UE 601 via the air interface.

One or more RANs of environment 900 (e.g., RAN 910 and/or RAN 912) may include, may implement, and/or may otherwise be communicatively coupled to one or more edge computing devices, such as one or more Multi-Access/Mobile Edge Computing ("MEC") devices (referred to sometimes herein simply as a "MECs") 914. MECs 914 may be co-located with wireless network infrastructure equipment of RANs 910 and/or 912 (e.g., one or more gNBs 911 and/or one or more eNBs 913, respectively). Additionally, or alternatively, MECs 914 may otherwise be associated with geographical regions (e.g., coverage areas) of wireless network infrastructure equipment of RANs 910 and/or 912. In some embodiments, one or more MECs 914 may be implemented by the same set of hardware resources, the same set of devices, etc. that implement wireless network infrastructure equipment of RANs 910 and/or 912. In some embodiments, one or more MECs 914 may be implemented by different hardware resources, a different set of devices, etc. from hardware resources or devices that implement wireless network infrastructure equipment of RANs 910 and/or 912. In some embodiments, MECs 914 may be communicatively coupled to wireless network infrastructure equipment of RANs 910 and/or 912 (e.g., via a high-speed and/or low-latency link such as a physical wired interface, a high-speed and/or low-latency wireless interface, or some other suitable communication pathway).

MECs 914 may include hardware resources (e.g., configurable or provisionable hardware resources) that may be configured to provide services and/or otherwise process traffic to and/or from UE 601, via RAN 910 and/or 912. For example, RAN 910 and/or 912 may route some traffic from UE 601 (e.g., traffic associated with one or more particular services, applications, application types, etc.) to a respective MEC 914 instead of to core network elements of 900 (e.g., UPF/PGW-U 935). MEC 914 may accordingly provide services to UE 601 by processing such traffic, performing one or more computations based on the received traffic, and providing traffic to UE 601 via RAN 910 and/or 912. MEC 914 may include, and/or may implement, some or all of the functionality described above with respect to UPF/PGW-U 935, AF 930, one or more application servers, and/or one or more other devices, systems, VNFs, CNFs, etc. In this manner, ultra-low latency services may be provided to UE 601, as traffic does not need to traverse links (e.g., backhaul links) between RAN 910 and/or 912 and the core network.

AMF 503 may include one or more devices, systems, VNFs, CNFs, etc., that perform operations to register UE 601 with the 5G network, to establish bearer channels associated with a session with UE 601, to hand off UE 601 from the 5G network to another network, to hand off UE 601 from the other network to the 5G network, manage mobility of UE 601 between RANs 910 and/or gNBs 911, and/or to perform other operations. In some embodiments, the 5G network may include multiple AMFs 503, which communicate with each other via the N14 interface (denoted in FIG. 9 by the line marked "N14" originating and terminating at AMF 503).

MME 916 may include one or more devices, systems, VNFs, CNFs, etc., that perform operations to register UE 601 with the EPC, to establish bearer channels associated with a session with UE 601, to hand off UE 601 from the EPC to another network, to hand off UE 601 from another network to the EPC, manage mobility of UE 601 between RANs 912 and/or eNBs 913, and/or to perform other operations.

SGW 917 may include one or more devices, systems, VNFs, CNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, CNFs, etc., that gather, process, store, and/or provide information in a manner described herein. SMF/PGW-C 920 may, for example, facilitate the establishment of communication sessions on behalf of UE 601. In some embodiments, the establishment of communications sessions may be performed in accordance with one or more policies provided by PCF/PCRF 925.

PCF/PCRF 925 may include one or more devices, systems, VNFs, CNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, CNFs, etc., that receive, store, and/or provide information that may be used in determining parameters (e.g., quality of service parameters, charging parameters, or the like) for certain applications.

UPF/PGW-U 935 may include one or more devices, systems, VNFs, CNFs, etc., that receive, store, and/or provide data (e.g., user plane data). For example, UPF/PGW-U 935 may receive user plane data (e.g., voice call traffic, data traffic, etc.), destined for UE 601, from DN 950, and may forward the user plane data toward UE 601 (e.g., via RAN 910, SMF/PGW-C 920, and/or one or more other devices). In some embodiments, multiple instances of UPF/PGW-U 935 may be deployed (e.g., in different geographical locations), and the delivery of content to UE 601 may be coordinated via the N9 interface (e.g., as denoted in FIG. 9 by the line marked "N9" originating and terminating at UPF/PGW-U 935). Similarly, UPF/PGW-U 935 may receive traffic from UE 601 (e.g., via RAN 910, RAN 912, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

UDM/HSS 940 and AUSF 945 may include one or more devices, systems, VNFs, CNFs, etc., that manage, update, and/or store, in one or more memory devices associated with AUSF 945 and/or UDM/HSS 940, profile information associated with a subscriber. In some embodiments, UDM/HSS 940 may include, may implement, may be communicatively coupled to, and/or may otherwise be associated with some other type of repository or database, such as a Unified Data Repository ("UDR"). AUSF 945 and/or UDM/HSS 940 may perform authentication, authorization, and/or accounting operations associated with one or more UEs 601 and/or one or more communication sessions associated with one or more UEs 601.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 601 may communicate, through DN 950, with data servers, other UEs 601, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 601 may communicate.

External devices 954 may include one or more devices or systems that communicate with UE 601 via DN 950 and one or more elements of 900 (e.g., via UPF/PGW-U 935). External devices 954 may include, for example, one or more application servers, content provider systems, web servers, or the like. External devices 954 may, for example, implement "server-side" applications that communicate with "client-side" applications executed by UE 601. External devices 954 may provide services to UE 601 such as gaming services, videoconferencing services, messaging services, email services, web services, and/or other types of services.

In some embodiments, external devices 954 may communicate with one or more elements of environment 900 (e.g., core network elements) via NEF/SCEF 949. NEF/SCEF 949 include one or more devices, systems, VNFs, CNFs, etc. that provide access to information, APIs, and/or other operations or mechanisms of one or more core network elements to devices or systems that are external to the core network (e.g., to external device 954 via DN 950). NEF/SCEF 949 may maintain authorization and/or authentication information associated with such external devices or systems, such that NEF/SCEF 949 is able to provide information, that is authorized to be provided, to the external devices or systems. For example, a given external device 954 may request particular information associated with one or more core network elements. NEF/SCEF 949 may authenticate the request and/or otherwise verify that external device 954 is authorized to receive the information, and may request, obtain, or otherwise receive the information from the one or more core network elements. In some embodiments, NEF/SCEF 949 may include, may implement, may be implemented by, may be communicatively coupled to, and/or may otherwise be associated with a Security Edge Protection Proxy ("SEPP"), which may perform some or all of the functions discussed above. External device 954 may, in some situations, subscribe to particular types of requested information provided by the one or more core network elements, and the one or more core network elements may provide (e.g., "push") the requested information to NEF/SCEF 949 (e.g., in a periodic or otherwise ongoing basis).

In some embodiments, external devices 954 may communicate with one or more elements of RAN 910 and/or 912 via an API or other suitable interface. For example, a given external device 954 may provide instructions, requests, etc. to RAN 910 and/or 912 to provide one or more services via one or more respective MECs 914. In some embodiments, such instructions, requests, etc. may include QoS parameters, Service Level Agreements ("SLAs"), etc. (e.g., maximum latency thresholds, minimum throughput thresholds, etc.) associated with the services.

Figure 10:
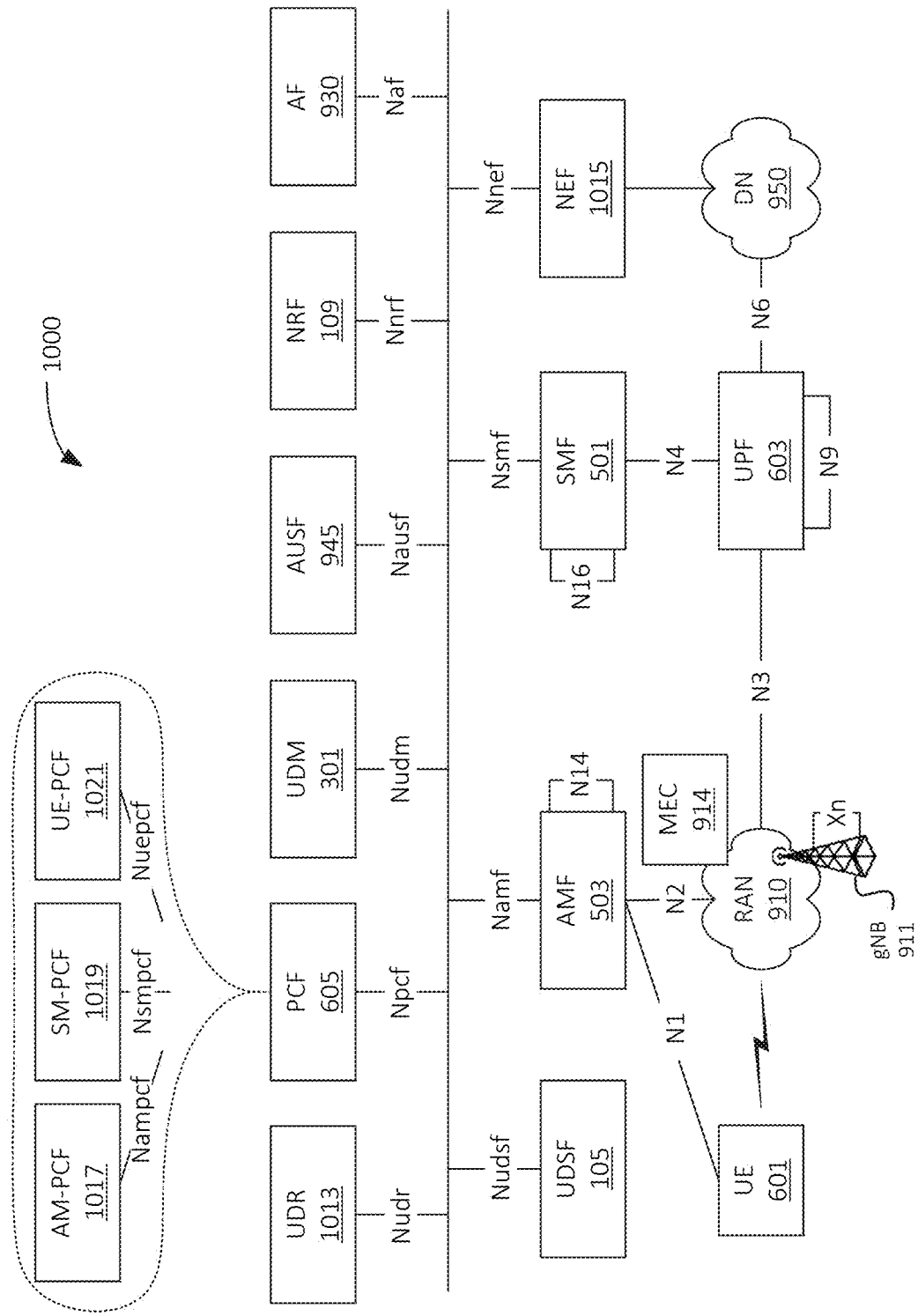

FIG. 10 illustrates another example environment 1000, in which one or more embodiments may be implemented. In some embodiments, environment 1000 may correspond to a 5G network, and/or may include elements of a 5G network. In some embodiments, environment 1000 may correspond to a 5G SA architecture. In some embodiments, environment 1000 may include a 5GC, in which 5GC network elements perform one or more operations described herein.

As shown, environment 1000 may include UE 601, RAN 910 (which may include one or more gNBs 911 or other types of wireless network infrastructure) and various network functions, which may be implemented as VNFs, CNFs, etc. Such network functions may include AMF 503, SMF 501, UPF 603, PCF 605, UDM 301, AUSF 945, NRF 109, AF 930, UDR 1013, and NEF 1015. Environment 1000 may also include or may be communicatively coupled to one or more networks, such as DN 950.

The example shown in FIG. 10 illustrates one instance of each network component or function (e.g., one instance of SMF 501, UPF 603, PCF 605, UDM 301, AUSF 945, etc.). In practice, environment 1000 may include multiple instances of such components or functions. For example, in some embodiments, environment 1000 may include multiple "slices" of a core network, where each slice includes a discrete and/or logical set of network functions (e.g., one slice may include a first instance of SMF 501, PCF 605, UPF 603, etc., while another slice may include a second instance of SMF 501, PCF 605, UPF 603, etc.). Additionally, or alternatively, one or more of the network functions of environment 1000 may implement multiple network slices. The different slices may provide differentiated levels of service, such as service in accordance with different QoS parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. In some implementations, one or more devices of environment 1000 may be physically integrated in, and/or may be physically attached to, one or more other devices of environment 1000. Alternatively, or additionally, one or more of the devices of environment 1000 may perform one or more network functions described as being performed by another one or more of the devices of environment 1000.

Elements of environment 1000 may interconnect with each other and/or other devices via wired connections, wireless connections, or a combination of wired and wireless connections. Examples of interfaces or communication pathways between the elements of environment 1000, as shown in FIG. 10, may include interfaces shown in FIG. 10 and/or one or more interfaces not explicitly shown in FIG. 10. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 1000 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 503), an Nudm interface (e.g., indicating communications to be routed to UDM 301), an Npcf interface, an Nupf interface, an Nnef interface, an Nsmf interface, an Nnrf interface, an Nudr interface, an Naf interface, and/or one or more other SBIs.

UPF 603 may include one or more devices, systems, VNFs, CNFs, etc., that receive, route, process, and/or forward traffic (e.g., user plane traffic). As discussed above, UPF 603 may communicate with UE 601 via one or more communication sessions, such as PDU sessions. Such PDU sessions may be associated with a particular network slice or other suitable QoS parameters, as noted above. UPF 603 may receive downlink user plane traffic (e.g., voice call traffic, data traffic, etc. destined for UE 601) from DN 950, and may forward the downlink user plane traffic toward UE 601 (e.g., via RAN 910). In some embodiments, multiple UPFs 603 may be deployed (e.g., in different geographical locations), and the delivery of content to UE 601 may be coordinated via the N9 interface. Similarly, UPF 603 may receive uplink traffic from UE 601 (e.g., via RAN 910), and may forward the traffic toward DN 950. In some embodiments, UPF 603 may implement, may be implemented by, may be communicatively coupled to, and/or may otherwise be associated with UPF/PGW-U 935. In some embodiments, UPF 603 may communicate (e.g., via the N4 interface) with SMF 501, regarding user plane data processed by UPF 603 (e.g., to provide analytics or reporting information, to receive policy and/or authorization information, etc.).

PCF 605 may include one or more devices, systems, VNFs, CNFs, etc., that aggregate, derive, generate, etc. policy information associated with the 5GC and/or UEs 601 that communicate via the 5GC and/or RAN 910. PCF 605 may receive information regarding policies and/or subscriptions from one or more sources, such as subscriber databases (e.g., UDM 301, UDR 1013, etc.), and/or from one or more users such as, for example, an administrator associated with PCF 605. In some embodiments, the functionality of PCF 605 may be split into multiple network functions or subsystems, such as access and mobility PCF ("AM-PCF") 1017, session management PCF ("SM-PCF") 1019, UE PCF ("UE-PCF") 1021, and so on. Such different "split" PCFs may be associated with respective SBIs (e.g., AM-PCF 1017 may be associated with an Nampcf SBI, SM-PCF 1019 may be associated with an Nsmpcf SBI, UE-PCF 1021 may be associated with an Nuepcf SBI, and so on) via which other network functions may communicate with the split PCFs. The split PCFs may maintain information regarding policies associated with different devices, systems, and/or network functions.

NRF 109 may include one or more devices, systems, VNFs, CNFs, etc. that maintain routing and/or network topology information associated with the 5GC. For example, NRF 109 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 1013 may include one or more devices, systems, VNFs, CNFs, etc. that provide user and/or subscriber information, based on which PCF 605 and/or other elements of environment 1000 may determine access policies, QoS policies, charging policies, or the like. In some embodiments, UDR 1013 may receive such information from UDM 301 and/or one or more other sources.

NEF 1015 include one or more devices, systems, VNFs, CNFs, etc. that provide access to information, APIs, and/or other operations or mechanisms of the 5GC to devices or systems that are external to the 5GC. NEF 1015 may maintain authorization and/or authentication information associated with such external devices or systems, such that NEF 1015 is able to provide information, that is authorized to be provided, to the external devices or systems. Such information may be received from other network functions of the 5GC (e.g., as authorized by an administrator or other suitable entity associated with the 5GC), such as SMF 501, UPF 603, a charging function ("CHF") of the 5GC, and/or other suitable network function. NEF 1015 may communicate with external devices or systems (e.g., external devices 954) via DN 950 and/or other suitable communication pathways.

While environment 1000 is described in the context of a 5GC, as noted above, environment 1000 may, in some embodiments, include or implement one or more other types of core networks. For example, in some embodiments, environment 1000 may be or may include a converged packet core, in which one or more elements may perform some or all of the functionality of one or more 5GC network functions and/or one or more EPC network functions. For example, in some embodiments, AMF 503 may include, may implement, may be implemented by, and/or may otherwise be associated with MME 916; SMF 501 may include, may implement, may be implemented by, and/or may otherwise be associated with SGW 917; PCF 605 may include, may implement, may be implemented by, and/or may otherwise be associated with a PCRF (e.g., PCF/PCRF 925); NEF 1015 may include, may implement, may be implemented by, and/or may otherwise be associated with a SCEF (e.g., NEF/SCEF 949); and so on.

Figure 11:
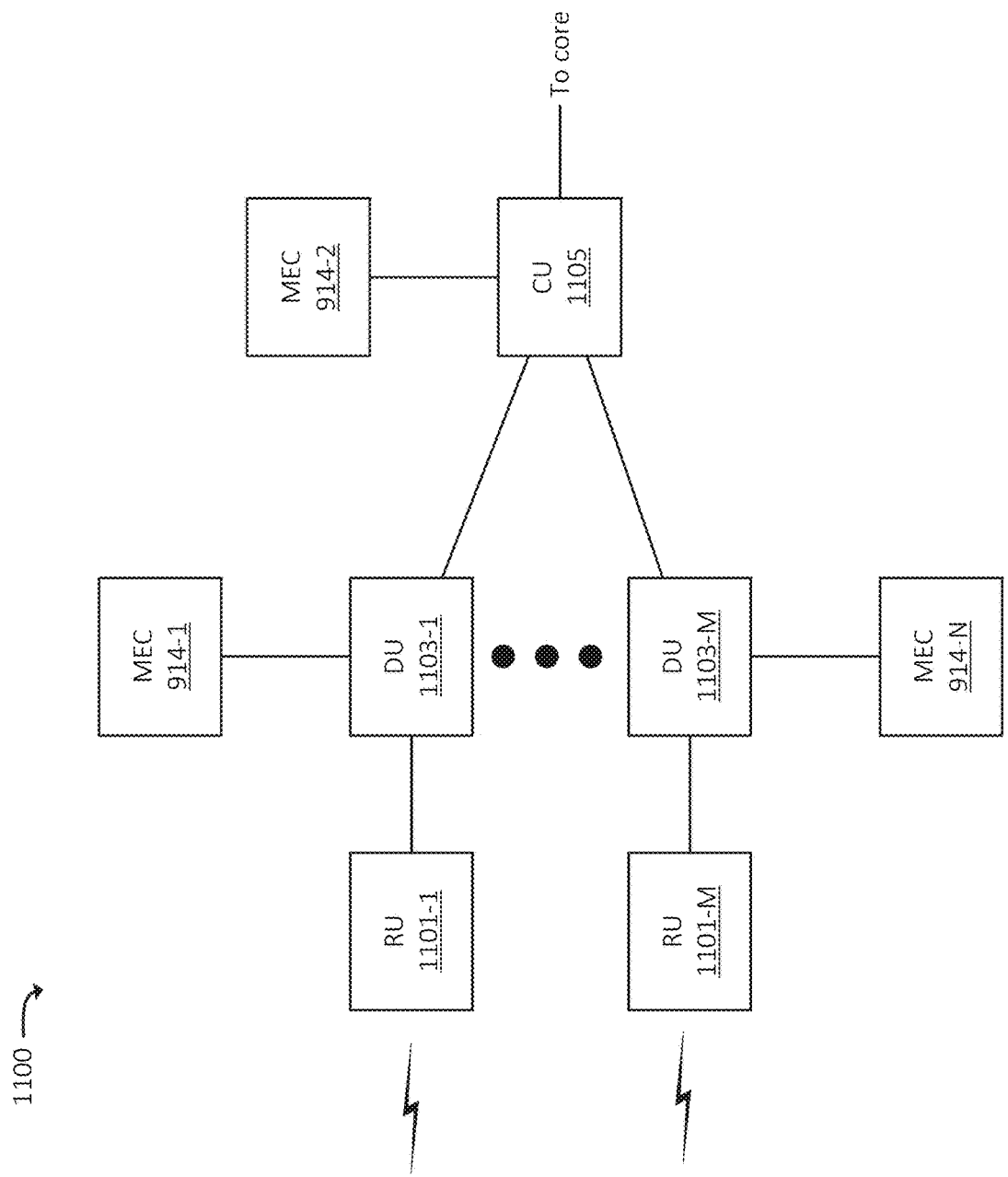
FIG. 11 illustrates an example arrangement of a radio access network ("RAN"), in accordance with some embodiments.

FIG. 11 illustrates an example RAN environment 1100, which may be included in and/or implemented by one or more RANs (e.g., RAN 910 or some other RAN). In some embodiments, a particular RAN 910 may include one RAN environment 1100. In some embodiments, a particular RAN 910 may include multiple RAN environments 1100. In some embodiments, RAN environment 1100 may correspond to a particular gNB 911 of RAN 910. In some embodiments, RAN environment 1100 may correspond to multiple gNBs 911. In some embodiments, RAN environment 1100 may correspond to one or more other types of base stations of one or more other types of RANs. As shown, RAN environment 1100 may include Central Unit ("CU") 1105, one or more Distributed Units ("DUs") 1103-1 through 1103-M (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 503 and/or UPF 603) and/or some other device or system such as MEC 914. In the uplink direction (e.g., for traffic from UEs 601 to a core network), CU 1105 may aggregate traffic from DUs 1103, and forward the aggregated traffic to the core network. In some embodiments, CU 1105 may receive traffic according to a given protocol (e.g., Radio Link Control ("RLC") traffic) from DUs 1103, and may perform higher-layer processing (e.g., may aggregate/process RLC packets and generate Packet Data Convergence Protocol ("PDCP") packets based on the RLC packets) on the traffic received from DUs 1103.

CU 1105 may receive downlink traffic (e.g., traffic from the core network, traffic from a given MEC 914, etc.) for a particular UE 601, and may determine which DU(s) 1103 should receive the downlink traffic. DU 1103 may include one or more devices that transmit traffic between a core network (e.g., via CU 1105) and UE 601 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 601.

RU 1101 may include hardware circuitry (e.g., one or more RF transceivers, antennas, radios, and/or other suitable hardware) to communicate wirelessly (e.g., via an RF interface) with one or more UEs 601, one or more other DUs 1103 (e.g., via RUs 1101 associated with DUs 1103), and/or any other suitable type of device. In the uplink direction, RU 1101 may receive traffic from UE 601 and/or another DU 1103 via the RF interface and may provide the traffic to DU 1103. In the downlink direction, RU 1101 may receive traffic from DU 1103, and may provide the traffic to UE 601 and/or another DU 1103.

One or more elements of RAN environment 1100 may, in some embodiments, be communicatively coupled to one or more MECs 914. For example, DU 1103-1 may be communicatively coupled to MEC 914-1, DU 1103-M may be communicatively coupled to MEC 914-N, CU 1105 may be communicatively coupled to MEC 914-2, and so on. MECs 914 may include hardware resources (e.g., configurable or provisionable hardware resources) that may be configured to provide services and/or otherwise process traffic to and/or from UE 601, via a respective RU 1101.

For example, DU 1103-1 may route some traffic, from UE 601, to MEC 914-1 instead of to a core network via CU 1105. MEC 914-1 may process the traffic, perform one or more computations based on the received traffic, and may provide traffic to UE 601 via RU 1101-1. As discussed above, MEC 914 may include, and/or may implement, some or all of the functionality described above with respect to UPF 603, AF 930, and/or one or more other devices, systems, VNFs, CNFs, etc. In this manner, ultra-low latency services may be provided to UE 601, as traffic does not need to traverse DU 1103, CU 1105, links between DU 1103 and CU 1105, and an intervening backhaul network between RAN environment 1100 and the core network.

Figure 12:
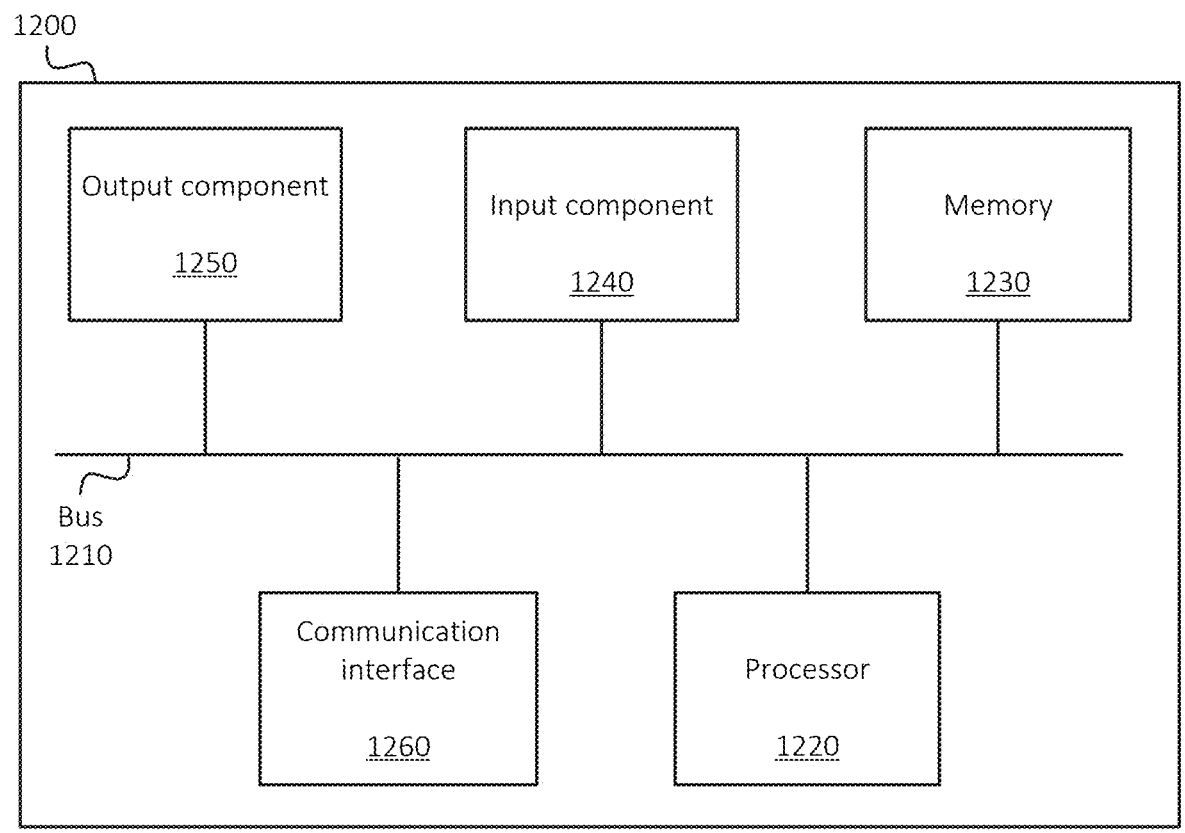
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, a set of provisioned hardware resources of a cloud computing system, or other suitable type of hardware that interprets and/or executes instructions (e.g., processor-executable instructions). In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to input component 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems (e.g., via RAN 910, RAN 912, DN 950, etc.). For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1200 may include more than one communication interface 1260. For instance, device 1200 may include an optical interface, a wireless interface, an Ethernet interface, and/or one or more other interfaces.

Device 1200 may perform certain operations relating to one or more processes described above. Device 1200 may perform these operations in response to processor 1220 executing instructions, such as software instructions, processor-executable instructions, etc. stored in a computer-readable medium, such as memory 1230. A computer-readable medium may be defined as a non-transitory memory device. A memory device may include space within a single physical memory device or spread across multiple physical memory devices. The instructions may be read into memory 1230 from another computer-readable medium or from another device. The instructions stored in memory 1230 may be processor-executable instructions that cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
implement a first instance of a particular Network Function ("NF") in a wireless network;
receive an instruction to restore functionality of a second instance of the particular NF, wherein the functionality of the second instance of the particular NF is associated with a plurality of services, wherein each service is associated with a respective set of NFs of the wireless network;

based on receiving the instruction to restore the functionality of the second instance of the particular NF, identify state information associated with the second instance of the particular NF, wherein the state information includes information identifying the plurality of services associated with the functionality provided by the second instance of the particular NF, wherein the plurality of services indicated in the state information include:

a first service that is associated with a first set of NFs and is further associated with a first priority, and a second service that is associated with a second set of NFs and is further associated with a second priority;

identify a priority associated with each service, of the plurality of services indicated in the state information associated with the second instance of the particular NF;

identify a sequence in which to restore each service of the plurality of services based on the priority associated with each service of the plurality of services; and restore each service, of the plurality of services indicated in the state information associated with the second instance of the particular NF, in the identified sequence, wherein restoring the first service includes notifying the first set of NFs that the first instance of the particular NF has replaced the second instance of the particular NF, wherein restoring the second service includes notifying the second set of NFs that the first instance of the particular NF has replaced the second instance of the particular NF, wherein restoring the first and second services in the identified sequence includes notifying the first set of NFs prior to notifying the second NFs, based on the first and second priorities that are respectively associated with the first and second services.

2. The device of claim 1, wherein the first set of NFs output messages to the first instance of the particular NF, instead of to the second instance of the particular NF, based on being notified that the first instance of the particular NF has replaced the second instance of the particular NF.

3. The device of claim 1, wherein the first instance of the particular NF and the second instance of the particular NF are instances of a same type of NF.

4. The device of claim 1, wherein the second instance of the particular NF provides the state information to a Unstructured Data Storage Function ("UDSF") of the wireless network, and wherein the first instance of the particular NF receives the state information from the UDSF.

5. The device of claim 1, wherein the one or more processors are further configured to receive policy information that indicates respective priority information for respective service attributes, wherein identifying the priority associated with a particular service includes:

identifying a set of service attributes associated with the particular service, and identifying a particular priority indicated in the policy information as being associated with the set of service attributes associated with the particular service.

6. The device of claim 5, wherein the service attributes include at least one of:

a network slice associated with the service, or a Data Network Name ("DNN") associated with the service.

7. The device of claim 1, wherein the particular NF includes a Session Management Function ("SMF"), and wherein the first set of NFs are associated with a first protocol data unit ("PDU") session, and wherein the second set of NFs are associated with a second PDU session.

8. A non-transitory computer-readable medium, storing a plurality of processor-executable instructions to:

implement a first instance of a particular Network Function ("NF") in a wireless network;

receive an instruction to restore functionality of a second instance of the particular NF, wherein the functionality of the second instance of the particular NF is associated with a plurality of services, wherein each service is associated with a respective set of NFs of the wireless network;

based on receiving the instruction to restore the functionality of the second instance of the particular NF, identify state information associated with the second instance of the particular NF, wherein the state information includes information identifying the plurality of services associated with the functionality provided by the second instance of the particular NF, wherein the plurality of services indicated in the state information include:

a first service that is associated with a first set of NFs and is further associated with a first priority, and a second service that is associated with a second set of NFs and is further associated with a second priority;

identify a priority associated with each service, of the plurality of services indicated in the state information associated with the second instance of the particular NF;

identify a sequence in which to restore each service of the plurality of services based on the priority associated with each service of the plurality of services; and restore each service, of the plurality of services indicated in the state information associated with the second instance of the particular NF, in the identified sequence, wherein restoring the first service includes notifying the first set of NFs that the first instance of the particular NF has replaced the second instance of the particular NF, wherein restoring the second service includes notifying the second set of NFs that the first instance of the particular NF has replaced the second instance of the particular NF, wherein restoring the first and second services in the identified sequence includes notifying the first set of NFs prior to notifying the second NFs, based on the first and second priorities that are respectively associated with the first and second services.

9. The non-transitory computer-readable medium of claim 8, wherein the first set of NFs output messages to the first instance of the particular NF, instead of to the second instance of the particular NF, based on being notified that the first instance of the particular NF has replaced the second instance of the particular NF.

10. The non-transitory computer-readable medium of claim 8, wherein the first instance of the particular NF and the second instance of the particular NF are instances of a same type of NF.

11. The non-transitory computer-readable medium of claim 8, wherein the second instance of the particular NF provides the state information to a Unstructured Data Storage Function ("UDSF") of the wireless network, and wherein the first instance of the particular NF receives the state information from the UDSF.

12. The non-transitory computer-readable medium of claim 8, wherein the plurality of processor-executable instructions further include processor-executable instructions to receive policy information that indicates respective priority information for respective service attributes,
 wherein the service attributes include at least one of:
  a network slice associated with the service, or
  a Data Network Name ("DNN") associated with the service, and
 wherein identifying the priority associated with a particular service includes:
  identifying a set of service attributes associated with the particular service, and
  identifying a particular priority indicated in the policy information as being associated with the set of service attributes associated with the particular service.

13. The non-transitory computer-readable medium of claim 8, wherein the particular NF includes a Session Management Function ("SMF"), and wherein the first set of NFs are associated with a first protocol data unit ("PDU") session, and wherein the second set of NFs are associated with a second PDU session.

14. A method performed by a first instance of a particular Network Function ("NF") in a wireless network, the method comprising:
 receiving an instruction to restore functionality of a second instance of the particular NF, wherein the functionality of the second instance of the particular NF is associated with a plurality of services, wherein each service is associated with a respective set of NFs of the wireless network;
 based on receiving the instruction to restore the functionality of the second instance of the particular NF, identifying state information associated with the second instance of the particular NF, wherein the state information includes information identifying the plurality of services associated with the functionality provided by the second instance of the particular NF, wherein the plurality of services indicated in the state information include:
  a first service that is associated with a first set of NFs and is further associated with a first priority, and
  a second service that is associated with a second set of NFs and is further associated with a second priority;
 identifying a priority associated with each service, of the plurality of services indicated in the state information associated with the second instance of the particular NF;
 identifying a sequence in which to restore each service of the plurality of services based on the priority associated with each service of the plurality of services; and
 restoring each service, of the plurality of services indicated in the state information associated with the second instance of the particular NF, in the identified sequence,
  wherein restoring the first service includes notifying the first set of NFs that the first instance of the particular NF has replaced the second instance of the particular NF,
  wherein restoring the second service includes notifying the second set of NFs that the first instance of the particular NF has replaced the second instance of the particular NF,
  wherein restoring the first and second services in the identified sequence includes notifying the first set of NFs prior to notifying the second NFs, based on the first and second priorities that are respectively associated with the first and second services.

15. The method of claim 14, wherein the first set of NFs output messages to the first instance of the particular NF, instead of to the second instance of the particular NF, based on being notified that the first instance of the particular NF has replaced the second instance of the particular NF.

16. The method of claim 14, wherein the first instance of the particular NF and the second instance of the particular NF are instances of a same type of NF.

17. The method of claim 14, wherein the second instance of the particular NF provides the state information to a Unstructured Data Storage Function ("UDSF") of the wireless network, and wherein the first instance of the particular NF receives the state information from the UDSF.

18. The method of claim 14, further including receiving policy information that indicates respective priority information for respective service attributes, wherein identifying the priority associated with a particular service includes:
 identifying a set of service attributes associated with the particular service, and
 identifying a particular priority indicated in the policy information as being associated with the set of service attributes associated with the particular service.

19. The method of claim 18, wherein the service attributes include at least one of:
 a network slice associated with the service, or
 a Data Network Name ("DNN") associated with the service.

20. The method of claim 14, wherein the particular NF includes a Session Management Function ("SMF"), and wherein the first set of NFs are associated with a first protocol data unit ("PDU") session, and wherein the second set of NFs are associated with a second PDU session.

\* \* \* \* \*